Nov. 25, 1941.    E. W. MURRILL    2,263,640
SHOCK ABSORBER
Filed July 16, 1940
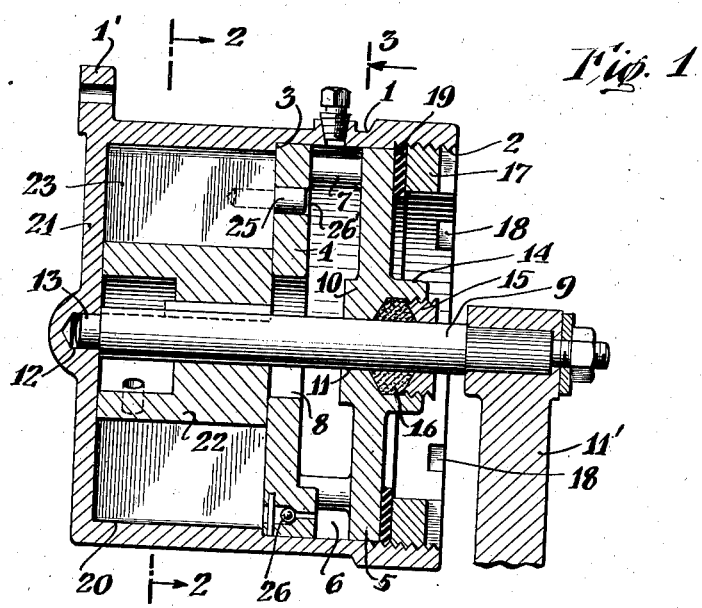
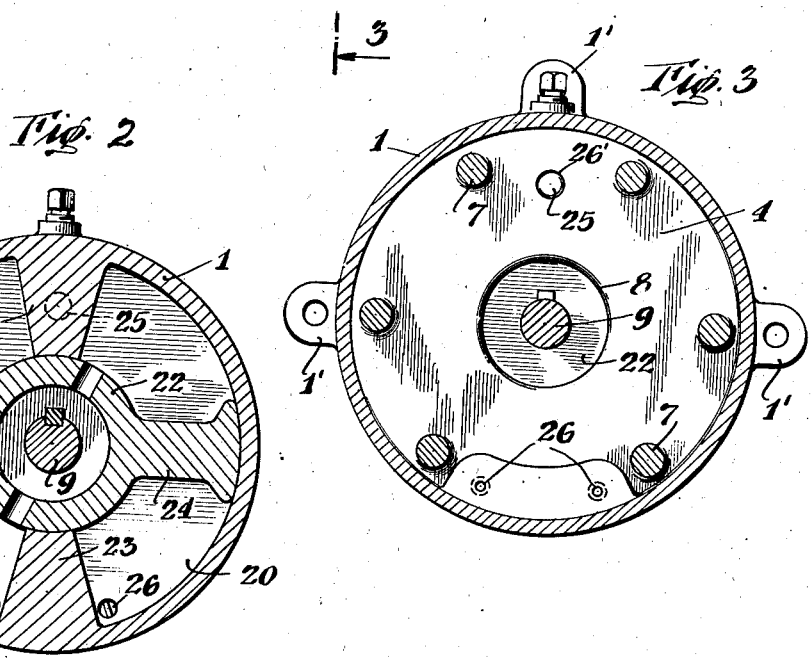
Edward W. Murrill, INVENTOR
BY Charles W. Mortimer, ATTORNEY Patented Nov. 25, 1941

2,263,640

UNITED STATES PATENT OFFICE 2,263,640

SHOCK ABSORBER

Edward W. Murrill, Mulberry, Fla.

Application July 16, 1940, Serial No. 345,720

2 Claims. (Cl. 188—89)

This invention relates to a hydraulic shock absorber in which a fluid such as oil, for example, is provided in a chamber in which an oscillating vane or piston or the equivalent operates.

Heretofore, objections to shock absorbers have arisen because during the operation thereof very high pressure oil or fluid reaches the bearing for the shaft which operates the vane or piston and comes directly against the packing seal around the shaft, particularly after the bearing becomes worn to some extent.

In shock absorbers of the prior art, either the seal around the shaft was located so that high pressures from the operation of the device were directly against the seal, or the bearings were placed close together and the seal was placed at a distance from the nearest bearing.

In this first construction where high pressure reached the seal, complicated drainage rings were provided around the shaft with the idea of protecting the seal from the high pressure developed in the operation of the device. These drainage rings entailed considerable costly machine work and were ineffective after the shaft or its bearing became worn to some extent due to the high velocity reached by the escaping fluid.

In this second construction where the bearings were placed close together, any play of the shaft in the bearings was increased by the lever-like action of the shaft. This excessive movement of the shaft against the packing soon resulted in leakage past the seal.

By the present invention no oil under high pressure reaches the seal that is provided around the shaft at its outer bearing because of the location of the reservoir for oil that may leak or escape from the chamber in which the piston or the like operates, while at the same time the outer bearing for the shaft is located immediately adjacent this seal, thus preventing the shaft from having substantially greater play at the seal than at the outer bearing.

In the present invention the shaft passes through the reservoir and the circumference of a portion of the shaft is directly exposed to the fluid in the reservoir instead of being in communication with the reservoir through the medium of drainage passages.

In carrying out this invention, a fluid containing chamber is provided in which a vane or piston operates against the fluid to absorb shocks, and a reservoir is provided to receive fluid or oil from this chamber and return it thereto without permitting any high pressure fluid to reach the seal for the shaft by which the vane or piston is operated. This fluid chamber is made substantially fluid-tight, and provision is made to permit passage of fluid from one side of the vane or plate to the other during the shock absorbing operation of the device.

The invention will be understood from the description in connection with the accompanying drawing, in which:

Fig. 1 is a longitudinal section through an illustrative embodiment of the invention;

Fig. 2 is a section along the line 2—2 of Fig. 1; and

Fig. 3 is a section along the line 3—3 of Fig. 1.

In the drawing, reference character 1 indicates a casing that is circular in cross section and is provided with lugs 1' for attachment of the casing to a vehicle or other support. One end of the casing is provided with internal screw threads 2. An annular shoulder 3 is provided in the casing 1 against which a circular plate or disc 4 bears. A similar circular plate 5 is spaced from the plate 4 to form a reservoir 6 between the two. The casing 1 and the plate 5 form a housing for the shock absorber. The plates 4 and 5 are connected by rods 7. The plate 4 is provided with an opening 8 at its center around the shaft 9, and the plate 5 is provided with a hub 10 at its center, through which a bearing 11 is provided for the shaft 9. An arm 11' is connected to the shaft. This arm 11' may be connected to the axle of a vehicle by a link not shown. A socket 12 is provided at the end of the casing 1 to form a bearing for the reduced end 13 of the shaft 10.

An internally threaded extension 14 is provided on the plate 5 around the shaft 10 for a screw plug 15 to compress the packing 16 around the shaft 10 and form a fluidtight joint.

An externally threaded hollow nut or plug 17 provided with sockets 18 for a wrench is screwed into the screw threads 2 at the end of the casing 1 to clamp the gasket 19 against the plate 5 and seal the joint.

A working chamber 20 for fluid such as oil is provided in the casing 1 between its end 21 and the plate 4. The shaft 10 is provided with a hub 22 rigidly attached thereto or integral therewith between the plate 4 and the back side of the casing 1 in the middle of the chamber 20. The working chamber 20 is divided into two equal portions by the radially extending partitions or sections 23. The hub 22 carries oppositely disposed radial pistons or vanes 24 working in the two respective portions of the chamber 20. Provision is made in any of the well known ways to permit regulated movement of fluid from one side of the sections 23 to the other during the operation of the pistons 24.

A pin 25 extends from the edge of one of the partitions 23 into a hole 26' in the disc 4 to locate this disc in the proper place when it is inserted. This disc 4 is provided with two one-way valves 26 located on opposite sides of the lower partition 23 to permit any fluid that may pass into the reservoir 6 to flow back into the working chamber 20 on opposite sides of this lower partition 23. In this way the danger of any fluid under high pressure reaching the seal 16 is entirely avoided without interfering in any way with the efficient operation of the device. And at the same time the two bearings 11 and 12 for the shaft 9 are located widely apart, so that play in the seal is effectively reduced.

This shock absorber is connected to a vehicle or the like in the usual way. No oil or other fluid under high presure reaches the bearing of the shaft 10 at any time, so that danger of leakage of oil from the casing 1 is eliminated.

What is claimed is:

1. A hydraulic shock absorber comprising a housing, a vane chamber, a reservoir, a shaft passing through said reservoir into said chamber, a bearing for said shaft in said chamber, one side of said reservoir having a free passage for fluid along said shaft, a bearing for said shaft on the side opposite said free passage, and a seal outside of said last named bearing, the circumference of a portion of said shaft being directly exposed to the fluid in said reservoir.

2. A hydraulic shock absorber comprising a housing, a vane chamber, a reservoir, a shaft passing through said reservoir into said chamber, a bearing for said shaft in said chamber, one side of said chamber and reservoir being in common and having an opening therethrough substantially larger than said shaft, a bearing for said shaft on the other side of said reservoir from said opening, and a seal outside of said last named bearing, the circumference of a portion of said shaft being directly exposed to the fluid in said reservoir.

EDWARD W. MURRILL.